United States Patent
Luo et al.

(10) Patent No.: US 9,782,757 B2
(45) Date of Patent: *Oct. 10, 2017

(54) MODIFIED Y-TYPE ZEOLITE AND PREPARATION PROCESS AND USE THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Yibin Luo, Beijing (CN); Li Zhuang, Beijing (CN); Minggang Li, Beijing (CN); Ying Ouyang, Beijing (CN); Xingtian Shu, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

(*) Notice: Subject to any disclaimer, the term of this patent is extended or adjusted under 35 U.S.C. 154(b) by 615 days.

This patent is subject to a terminal disclaimer.

(21) Appl. No.: 14/354,464

(22) PCT Filed: Oct. 26, 2012

(86) PCT No.: PCT/CN2012/001436
§ 371 (c)(1),
(2) Date: Apr. 25, 2014

(87) PCT Pub. No.: WO2013/060099
PCT Pub. Date: May 2, 2013

(65) Prior Publication Data
US 2014/0299511 A1 Oct. 9, 2014

(30) Foreign Application Priority Data
Oct. 26, 2011 (CN) .......................... 2011 1 0328762

(51) Int. Cl.
| | |
|---|---|
| *B01J 29/08* | (2006.01) |
| *C10G 11/05* | (2006.01) |
| *B01J 35/00* | (2006.01) |
| *B01J 29/85* | (2006.01) |
| *C01B 39/02* | (2006.01) |
| *B01J 37/28* | (2006.01) |

(52) U.S. Cl.
CPC .......... *B01J 29/088* (2013.01); *B01J 29/084* (2013.01); *B01J 29/85* (2013.01); *B01J 35/002* (2013.01); *B01J 37/28* (2013.01); *C01B 39/026* (2013.01); *C10G 11/05* (2013.01); *B01J 2229/16* (2013.01); *B01J 2229/186* (2013.01); *B01J 2229/32* (2013.01); *B01J 2229/37* (2013.01)

(58) Field of Classification Search
CPC ....... C10G 11/05; B01J 29/084; B01J 29/088; B01J 29/85; B01J 37/28
See application file for complete search history.

(56) References Cited

U.S. PATENT DOCUMENTS
3,442,795 A 5/1969 Kerr et al.

FOREIGN PATENT DOCUMENTS

| | | |
|---|---|---|
| CN | 1317547 A | 10/2001 |
| CN | 1388064 A | 1/2003 |
| CN | 1436727 A | 8/2003 |
| CN | 1506161 A | 6/2004 |
| CN | 1624079 A | 6/2005 |
| CN | 1951814 A | 4/2007 |
| CN | 101537366 A | 9/2009 |
| EP | 0421422 A2 | 4/1991 |
| JP | 2009543693 A | 12/2009 |

OTHER PUBLICATIONS

Machine translation of CN 101537366A, pub. Sep. 23, 2009, obtained from Google (Sep. 14, 2016).*
Machine translation of CN 1388064A, pub. Jan. 1, 2003, obtained from Google (Sep. 14, 2016).*
Xingyun Lin, et al. "Quantitative Characterization of 'Hydroxyl Nests' Concentration for the Dealuminated Y Zeolite." Acta Physico-Chimica Sinica, vol. 14, No. 12 (Dec. 1998), pp. 1094-1097.

* cited by examiner

*Primary Examiner* — Renee Robinson
(74) *Attorney, Agent, or Firm* — Novick, Kim & Lee, PLLC; Allen Xue (57) ABSTRACT

A modified Y-type molecular sieve has a unit cell size of 2.420-2.440 nm. It contains a phosphorus content of 0.05-6%, a $RE_2O_3$ content of 0.03-10%, and an alumina content of less than 22%, and a specific hydroxyl nest concentration of less than 0.35 mmol/g and more than 0.05 mmol/g. The modified Y-type molecular sieve is used as the active component in a catalytic cracking catalyst. The catalytic cracking catalyst maintains a stable activity for a long time, effectively controls the coke yield and increases the heavy oil utilization.

20 Claims, 2 Drawing Sheets

MODIFIED Y-TYPE ZEOLITE AND PREPARATION PROCESS AND USE THEREOF

TECHNICAL FIELD

The present invention relates to a modified Y-type zeolite and a preparation process and use thereof. More specifically, the present invention relates to a Y-type zeolite modified with phosphorus and rare earth, which zeolite has a good stability and a decreased coke yield, and a preparation process and use thereof.

BACKGROUND OF THE INVENTION

As the petroleum resource is decreasing, it is true that the crude oil feedstock becomes heavier and inferior. It is inevitable for the catalytic cracking, as the main treatment method for converting heavy oil to light fuel such as gasoline and diesel oil, to treat heavy oil feedstock in the poorer quality in a larger quantity. Accordingly, much attention is put to the technology of catalytically cracking the heavy oil.

The effects on the catalytic cracking made by the crude oil feedstock becoming heavier and inferiorer are the decreased conversion and the increased coke yield. Therefore, many researches are done in different ways, including the molecular sieve modification, the catalyst production and the process design (Liu Tao, Zhang Zhongdong, Zhang Haitao, Sino-Global Energy. 2009, 14(1):71-77). However, most of the current catalyst design and industrial operation, the high yield of light oil and LPG is achieved by increasing the cracking reaction conversion, and therefore the coke yield is remarkably increased.

CN1436727A discloses a process for preparing a modified faujasite. According to that process, a faujasite, a phosphorus compound and an ammonium compound are firstly subjected to an exchange reaction, wherein the weight ratio of water to faujasite is 2-25, the pH is 2.0-6.5, the temperature is 10-150° C., and the exchange time is 0.1-4 hours. Then a rare earth solution is introduced to the exchange slurry. The reaction lasts for 1-60 minutes. After filtering and washing, the zeolite modified with phosphorus and rare earth is calcined at 250-800° C. under 1-100% steam for 0.1-3.5 hours to provide the final zeolite. The modified zeolite as prepared has a unit cell size of 2.440-2.465 nm, a sodium oxide content of 2.0-6.5 wt %, a phosphorus content of 0.01-3 wt %, and a rare earth oxide content of 0.1-15 wt % CN1624079A also proposes a similar process for modifying the molecular sieve, but the prepared molecular sieve has a relatively larger unit cell size.

CN1506161A discloses a rare earth ultrastable Y-type molecular sieve active component. This modified molecular sieve contains 8-25 wt % of rare earth oxide, 0.1-3.0 wt % of phosphorus and 0.3-2.5 wt % of sodium oxide, and has a crystallinity of 30-55% and a unit cell size of 2.455-2.472 nm. The molecular sieve is prepared with a NaY zeolite as starting material. The NaY zeolite is subjected to an exchange with rare earth and a first calcination to obtain a rare earth NaY that has experienced the first exchange and the first calcination. The rare earth NaY is then reacted with rare earth, a phosphorus-containing substance and an ammonium salt, and the resulting substance is subjected to a second calcination to obtain a Y-type zeolite modified with phosphorus and rare earth. This modified molecular sieve has a moderate coke yield. The molecular sieve as prepared has a relatively high rare earth content and a large unit cell size, which have a negative effect on the coke selectivity for the molecular sieve.

CN1317547A discloses a phosphorus and rare earth modified Y-type zeolite and a preparation process thereof. The molecular sieve is prepared with a NaY zeolite as starting material. The NaY zeolite is exchanged with a mixture of rare earth and an ammonium salt, and then subjected to a hydrothermal calcination, followed by reacting with a phosphorus compound and being subjected to a second calcination, wherein the $RE_2O_3$/Y-type zeolite weight ratio is 0.02-0.18, the ammonium salt/Y-type zeolite weight ratio is 0.1-1.0, and the P/Y-type zeolite weight ratio is 0.003-0.05. The calcination is conducted at a temperature of 250-750° C. under a steam condition of 5-100% for 0.2-3.5 hours.

CN101537366A discloses a modified molecular sieve that can have an improved coke formation property. The molecular sieve is prepared with a NaY zeolite as starting material and produced through two exchanges and two calcinations. The molecular sieve has a phosphorus content of 0.05-5.0 wt %, a $RE_2O_3$ content of 0.05-4.0 wt %, a unit cell size of 2.430-2.440 nm, and a crystallinity of 35-55%. The modified molecular sieve has a large hole volume of medium- and large-sized holes and a good stability. The modified molecular sieve has the advantages of reducing the catalyst's coke yield, simultaneously further improving the heavy oil cracking capability, further improving the total yield of liquid products, and particularly facilitating the improvement in the yield of light oil.

EP0421422 discloses a faujasite for hydrocracking. The faujasite absorbs an infrared in a frequency region of $3740\pm10$ $cm^{-1}$ in an absorption percentage A of at least 20% and absorbs an infrared in a frequency region of $3560\pm10$ $cm^{-1}$ in an absorption percentage B of at least 5%, the ratio of A/B being at least 2, has a specific surface area of at least 650 $m^2/g$, has a framework $SiO_2/Al_2O_3$ molar ratio of from 20 to 50, and has a unit cell size of 2.415 nm-2.450 nm.

CN1951814A discloses a modified Y-type zeolite, which has a $SiO_2/Al_2O_3$ molar ratio of 7-30, a specific surface area of 700-900 $m^2/g$, a unit cell size of 2.425-2.445 nm, a relative crystallinity of 80%, and a $Na_2O$ content of ≤0.25%. The secondary pores of a diameter ranging from 1.7 to 10 nm comprise more than 45% by volume of the total pores. The non-framework aluminum comprises more than 30% of the total aluminum. The modified Y-type zeolite has an infrared acid volumn of 0.15-0.55 mmol/g. The modified zeolite is prepared with NaY as starting material, and produced through an ammonium exchange, a hydrothermal treatment, a non-framework aluminum removal, a pore expansion, a second hydrothermal treatment and the like.

The above patent literatures disclose the Si/Al ratio of the Y-type zeolite is increased by hydrothermal dealumination and/or chemical dealumination, and the shrinkage of unit cell is achieved by the second hydrothermal calcination. However, during the course of the deep dealumination ($SiO_2/Al_2O_3$ molar ratio≥15), the zeolite structure is often destroyed to decrease the zeolite crystallinity.

SUMMARY OF THE INVENTION

An object of the present invention is to provide a modified Y-type zeolite containing phosphorus and rare earth, which has a good stability and/or a decreased coke yield.

Another object of the present invention is to provide a preparation process for the modified Y-type zeolite.

Another object of the present invention is to provide a use of the modified Y-type zeolite in catalytically cracking the raw heavy oil.

The present invention provides a modified Y-type zeolite, which is characterized by having a unit cell size of 2.420-2.440 nm; as percent by weight of the modified Y-type zeolite, a phosphorus content of 0.05-6%, a $RE_2O_3$ content of 0.03-10%, and an alumina content of less than 22%; and a specific hydroxyl nest concentration of less than 0.35 mmol/g and more than 0.05 mmol/g, said specific hydroxyl nest concentration =

$$\frac{[(M_{500° C.} - M_{200° C.}) - (17/9) \times (M_{800° C.} - M_{500° C.})] \times 1000}{36 \times (1 - M_{200° C.}) \times C}$$

(Unit: mmol/g)

wherein $M_{200° C.}$, $M_{500° C.}$ and $M_{800° C.}$ respectively represent the weight loss percents of a sample measured at 200° C., 500° C. and 800° C., and C is the crystallinity of the sample. The weight loss percent and the crystallinity of the sample are measured according to the methods as mentioned hereinafter.

The present invention also provides a process for preparing the above-mentioned modified Y-type zeolite, wherein said modified Y-type zeolite is obtained by using a NaY zeolite as starting material and through a three-exchanges-and-three-calcinations procedure. That is to say, the zeolite as starting material is subjected to a combination procedure comprising three exchange steps and three hydrothermally treating steps. The introduction of phosphorus and rare earth is done by the exchange step. The zeolite is added to a phosphorus-containing exchanging solution or a rare earth-containing exchanging solution to conduct the exchange. Phosphorus can be introduced at any exchange step, and can be added once or for several times. Rare earth can be introduced at any exchange step except the first exchange step. In the exchange step, a dealumination agent can be added to conduct a chemical dealumination for promoting the removal of aluminum. The chemical dealumination can be conducted at any exchange step except the first exchange step.

Since the aluminum vacancies formed after dealumination can be substituted with silicon as much as possible, the modified Y-type zeolite according to the present invention has few defect in the crystal lattice, and therefore has a very excellent stability, a good structure-hydrothermal stability and a good activity-hydrothermal stability. The application of the modified Y-type zeolite in the catalytic cracking catalyst as active component can maintain a long period stable activity, effectively control the coke yield and increase the heavy oil utilization.

More specifically, the present invention provides the following technical solutions:

1. A modified Y-type zeolite, which is characterized by having a unit cell size of 2.420-2.440 nm;

as percent by weight of the modified Y-type zeolite, a phosphorus content of 0.05-6%, a $RE_2O_3$ content of 0.03-10%, and an alumina content of less than 22%; and a specific hydroxyl nest concentration of less than 0.35 mmol/g and more than 0.05 mmol/g, said specific hydroxyl nest concentration =

$$\frac{[(M_{500° C.} - M_{200° C.}) - (17/9) \times (M_{800° C.} - M_{500° C.})] \times 1000}{36 \times (1 - M_{200° C.}) \times C}$$

(Unit: mmol/g)

wherein $M_{200° C.}$, $M_{500° C.}$ and $M_{800° C.}$ respectively represent the weight loss percents of a sample measured at 200° C., 500° C. and 800° C., and C is the crystallinity of the sample.

2. The modified Y-type zeolite according to technical solution 1, wherein said unit cell size is 2.428-2.438 nm; as percent by weight of the modified Y-type zeolite, the phosphorus content is 0.1-4.5%, the $RE_2O_3$ content is 0.1-4.5%, the alumina content is less than 21%; the specific hydroxyl nest concentration is less than 0.3 mmol/g and more than 0.10 mmol/g.

3. A process for preparing the modified Y-type zeolite according to any one of technical solutions 1-2, wherein the modified Y-type zeolite is obtained by using a NaY zeolite as starting material and through three exchange steps in which a rare earth-containing substance and a phosphorus-containing substance are used and three hydrothermally treating steps, wherein, the introduction of phosphorus and rare earth is done by the exchange step;

wherein independently in each exchange step, the zeolite is added to a phosphorus-containing exchanging solution or a rare earth-containing exchanging solution;

wherein phosphorus is introduced at any exchange step; and wherein rare earth is introduced at any exchange step except the first exchange step.

4. The process according to technical solution 3, wherein said process further comprises: a dealumination agent is introduced at any exchange step except the first exchange step.

5. The process according to any one of technical solutions 3-4, wherein said phosphorus-containing substance is selected from the group consisting of orthophosphoric acid, phosphorous acid, pyrophosphoric acid, ammonium phosphate, diammonium hydrogen phosphate, ammonium dihydrogen phosphate, aluminum phosphate, and any mixture thereof.

6. The process according to any one of technical solutions 3-5, wherein said rare earth-containing substance is selected from the group consisting of lanthanum oxide, cerium oxide, lanthanum nitrate, cerium nitrate, lanthanum chloride, cerium chloride, a mixed rare earth nitrate, a mixed rare earth chloride, and any mixture thereof.

7. The process according to any one of technical solutions 4-6, wherein said dealumination agent is selected from the group consisting of ethylene diamine tetraacetic acid, oxalic acid, citric acid, sulfosalicylic acid, fluorosilicic acid, hydrochloric acid, sulphuric acid, nitric acid, ammonium oxalate, ammonium fluoride, ammonium fluorosilicate, ammonium fluoroborate, and any mixture thereof.

8. The process according to any one of technical solutions 3-7, which further comprises: the exchange is conducted at 60-100° C., e.g. 70-90° C. for at least 0.5 hour, e.g. 1-2 hours.

9. The process according to any one of technical solutions 3-8, wherein each of the hydrothermally treating steps is independently conducted at 350-650° C., e.g. 550-600° C., in a condition of 1-100%, e.g. 70%-100% steam for at least 0.5 hour, e.g. 1-2 hours.

10. The process according to any one of technical solutions 3-9, which is characterized in that said process comprises the following steps:

1) a NaY zeolite is mixed with an ammonium salt, an ammonium phosphate salt and water in a ratio of the NaY zeolite:the ammonium salt:the ammonium phosphate salt:water=1:[0.4-1]:[0-0.04]:[5-10] to obtain a slurry, the slurry is adjusted with an inorganic acid to a pH of 3.0-4.5, then the slurry is treated at 70-95° C. for at least 0.5 hour, and then washed, wherein, the NaY zeolite is on the dry basis, the ammonium phosphate salt is based on the elemental phosphorus;

2) the product obtained in the step 1) is calcined at 350-650° C. in a condition of 1-100% steam for at least 0.5 hour to obtain a firstly calcined zeolite;

3) the firstly calcined zeolite obtained in the step 2), phosphoric acid, an dealumination agent and water are mixed in a ratio of the firstly calcined zeolite:phosphoric acid:the dealumination agent:water=1:[0-0.04]:[0.02-0.3]:[5-10], the resulting mixture is adjusted with an inorganic acid to a pH of 2.3-3.5, then treated at 50-90° C. for at least 0.5 hour, filtered and washed (washing temperature≥50° C.), wherein, the firstly calcined zeolite is on the dry basis, and phosphoric acid is based on the elemental phosphorus;

4) the product obtained in the step 3) is calcined at 350-650° C. in a condition of 1-100% steam for at least 0.5 hour to obtain a secondly calcined zeolite;

5) the secondly calcined zeolite obtained in the step 4) is mixed with a (mixed) rare earth chloride and water in a ratio of the secondly calcined zeolite:the rare earth chloride:water=1:[0.01-0.05]:[5-10], the resulting mixture is then treated at 70-90° C. for at least 0.5 hour, filtered and washed (washing temperature≥50° C.), wherein, the secondly calcined zeolite is on the dry basis, and the rare earth chloride is based on $RE_2O_3$;

6) the product obtained in the step 5) is calcined at 350-650° C., in a condition of 1-100% steam for at least 0.5 hour to obtain a modified Y-type zeolite.

11. A use of the modified Y-type zeolite according to technical solution 1 or 2 or the modified Y-type zeolite prepared by the process according to any one of technical solutions 3-10 in catalytically cracking a heavy oil feedstock.

DESCRIPTION OF PREFERRED EMBODIMENTS

Coke is composed of various hydrogen-deficient compounds having different hydrogen deficiency degrees. It is a product of the hydrogen transfer reaction. Therefore, in order to decrease the coke yield, it is required to reduce the hydrogen transfer reaction. The main course of hydrogen transfer reaction is the adsorption, reaction and desorption of protonated olefins on the acid sites of the zeolite. The higher the acid site density of the zeolite is, the intenser the hydrogen transfer reaction becomes. The acid site density of the zeolite is relevant to the framework $SiO_2/Al_2O_3$ molar ratio of the zeolite. The lower the framework $SiO_2/Al_2O_3$ molar ratio of the zeolite, the more the number of the acid sites of aluminum-oxygen tetrahedron, the higher the acid site density of the zeolite, the more the number of the hydrogen transfer reactions, the quicker the hydrogen transfer reaction, and the higher the coke yield; on the opposite, the higher the framework $SiO_2/Al_2O_3$ molar ratio of the zeolite, the lower the acid site density of the zeolite, the less the number of the hydrogen transfer reactions, and the lower the coke yield. Therefore, in order to ensure that an active component has a good coke selectivity, it is required for the active component to have a lower unit cell size and a suitable acid site density.

The present invention provides a modified Y-type zeolite, wherein the unit cell size is 2.420-2.440 nm, preferably the unit cell size is 2.428-2.438 nm; as percent by weight, the phosphorus content is 0.05-6%, preferably 0.1-4.5%, the $RE_2O_3$ content is 0.03-10%, preferably 0.1-4.5%, the alumina content is less than 22%, preferably less than 21%, the specific hydroxyl nest concentration is less than 0.35 mmol/g, preferably less than 0.3 mmol/g and more than 0.05 mmol/g, preferably more than 0.10 mmol/g, said specific hydroxyl nest concentration =

$$\frac{[(M_{500°\,C.} - M_{200°\,C.}) - (17/9) \times (M_{800°\,C.} - M_{500°\,C.})] \times 1000}{36 \times (1 - M_{200°\,C.}) \times C}$$

(Unit: mmol/g)

wherein $M_{200°\,C.}$, $M_{500°\,C.}$ and $M_{800°\,C.}$ respectively represent the weight loss percents of a sample measured at 200° C., 500° C. and 800° C., and C is the crystallinity of the sample.

Due to framework dealumination of the zeolite, the "hydroxyl nest" is formed from four adjacent Si—OH groups at its aluminum vacancy. The hydroxyl nest is a defect site in the crystal lattice of the zeolite. The number of the hydroxyl nest is directly relevant to the structure stability of the zeolite. The more the hydroxyl nests, the more the aluminum vacancies formed due to framework dealumination of the zeolite, and the poorer the structure stability of the zeolite. The aluminum vacancies formed during the hydrothermal or chemical dealumination of the Y-type zeolite are substituted with free silicon. The dealumination process and the treating conditions in the modification of the zeolite have a direct impact on the stability of the modified zeolite. It is surprisingly found by the present inventors based on a large quantity of experiments that after the three-exchanges-and-three-calcinations procedure, in the modified Y-type zeolite, the aluminum vacancies formed in the skeleton dealumination can be sufficiently substituted with silicon, the number of hydroxyl nests reduce, and therefore the stability is remarkably increased.

For the Y-type zeolite provided by the present invention, the specific hydroxyl nest concentration is characterized by a method in the literature (Liu Xing-Yun, Liu Hui, Li Xuan-Wen, Xu Xiao-Jie. Quantitative Characterization of "Hydroxyl Nests" Concentration for the Dealuminated Y Zeolite [J]. Acta Phys. Chim. Sin., 1998, 14(12): 1094-1097). According to that method, the specific hydroxyl nest concentration is obtained by the thermo-gravimetric analysis and calculation for the sample.

On the weight loss curve, the curve below 200° C. corresponds to the weight loss due to removal of the adsorbed water, the curve of 200° C.-500° C. corresponds to the weight loss due to removal of ammonium from zeolite and removal of water from hydroxyl nest, and the curve of 500° C.-800° C. corresponds to the weight loss due to removal of hydroxy. The decomposition of $NH_4^+$ on the Y-type zeolite produces an acidic hydroxy, and therefore, the mole number of hydroxyl corresponds to that of $NH_3$. Thus, the mole number of hydroxyl is calculated from the weight loss curve of 500° C.-800° C., and converted to the mass of $NH_3$. The mole number of hydroxyl nest can be calculated by subtracting the amount of $NH_3$ from the weight loss amount calculated from the weight loss curve of 200° C.-500° C.

In hydroxyl nest concentration calculation, one hydroxyl nest disappears due to removal of two molecules of water, and therefore its molar mass is 36; and two hydroxyl groups removes one molecule of water, and therefore its molar mass is 9.

The present invention also provides a process for preparing the above-mentioned modified Y-type zeolite, wherein said modified Y-type zeolite is obtained by using a NaY zeolite as starting material and through a three-exchanges-and-three-calcinations procedure. The so-called "three-exchanges-and-three-calcinations procedure" refers to a modification process for the zeolite for short. That is to say, the zeolite as starting material is subjected to a combination procedure comprising three exchange steps and three hydrothermally treating steps. The introduction of phosphorus and rare earth is done by the exchange step. The zeolite is added to a phosphorus-containing exchanging solution or a rare earth-containing exchanging solution to conduct the exchange. Phosphorus can be introduced at any exchange step, and can be added once or for several times. Rare earth can be introduced at any exchange step except the first exchange step. In the exchange step, a dealumination agent can be added to conduct a chemical dealumination for promoting the removal of aluminum. The chemical dealumination can be conducted at any exchange step except the first exchange step.

In an embodiment of the present invention, said phosphorus-containing exchanging solution contains a phosphorus-containing substance.

In an embodiment of the present invention, said rare earth-containing exchanging solution contains a rare earth-containing substance.

In an embodiment of the present invention, said phosphorus-containing exchanging solution does not contain any rare earth-containing substance.

In an embodiment of the present invention, said rare earth-containing exchanging solution does not contain any phosphorus-containing substance.

According to the present invention, the phosphorus-containing substance refer to one or more of orthophosphoric acid, phosphorous acid, pyrophosphoric acid, ammonium phosphate, diammonium hydrogen phosphate, ammonium dihydrogen phosphate, aluminum phosphate.

According to the present invention, the ammonium salt refers to one or more of ammonium chloride, ammonium nitrate, ammonium carbonate, ammonium hydrogen carbonate, ammonium oxalate, ammonium sulfate, and ammonium hydrogen sulfate.

According to the present invention, the ammonium phosphate salt refers to one or more of ammonium phosphate, diammonium hydrogen phosphate, and ammonium dihydrogen phosphate.

According to the present invention, the rare earth-containing substance refers to one or more of lanthanum oxide, cerium oxide, lanthanum nitrate, cerium nitrate, lanthanum chloride, cerium chloride, a mixed rare earth nitrate, and a mixed rare earth chloride.

The mixed rare earth nitrate refers to $(RE_{x1}RE_{x2} \ldots RE_{xn})(NO_3)_3$, wherein $RE_{x1}, RE_{x2}, \ldots, RE_{xn}$ refer to rare earth elements, wherein n is an integer of 2 or more, the sum of $x1+x2+ \ldots +xn$ equals to 1.

The mixed rare earth chloride (also called as the rare earth chloride) refers to $(RE_{y1}RE_{y2} \ldots RE_{yn})Cl_3$, wherein $RE_{y1}RE_{y2}, \ldots, RE_{yn}$ refer to rare earth elements, wherein n is an integer of 2 or more, the sum of $y1+y2+ \ldots +yn$ equals to 1.

According to the present invention, said dealumination agent is selected from the group consisting of organic acids (including ethylene diamine tetraacetic acid, oxalic acid, citric acid, and sulfosalicylic acid), inorganic acids (including fluorosilicic acid, hydrochloric acid, sulphuric acid, nitric acid), organic and inorganic salts (including ammonium oxalate, ammonium fluoride, ammonium fluorosilicate, and ammonium fluoroborate).

According to the present invention, the preparation process for said modified Y-type zeolite comprises a NaY zeolite is used as starting material and subjected to three exchanges and three hydrothermal treatments to obtain a modified Y-type zeolite, wherein independently in each exchange step, the zeolite is added to a phosphorus-containing exchanging solution or a rare earth-containing exchanging solution, the exchange is usually conducted at 60-100° C., preferably 70-90° C. for at least 0.5 hour, e.g. 1-2 hours. Phosphorus can be introduced at any exchange step, and can be added once or for several times. Rare earth can be introduced at any exchange step except the first exchange step. A chemical dealumination agent can be introduced at any exchange step except the first exchange step. Each of the hydrothermally treating steps is independently conducted at 350-650° C., e.g. 550-600° C., in a condition of 1-100%, e.g. 70%-100% steam for at least 0.5 hour, e.g. 1-2 hours.

In an embodiment of the process according to the present invention, the exchange is conducted at 60-100° C., e.g. 60-95° C., such as 70-90° C.

In an embodiment of the process according to the present invention, the exchange is conducted for 0.5-5 hours, e.g. 1-2 hours.

In an embodiment of the process according to the present invention, the hydrothermal treatment is conducted at 350-650° C., e.g. 550-600° C.

In an embodiment of the process according to the present invention, the hydrothermal treatment is conducted in a condition of 1-100%, e.g. 70%-100% steam.

In an embodiment of the process according to the present invention, the hydrothermal treatment is conducted for at least 0.5 hour, e.g. 1-2 hours.

According to the process of the present invention, the pH value of the liquid to which has been added the phosphorus-containing exchanging solution or the rare earth-containing exchanging solution in the exchange step can be adjusted with an inorganic acid, for example, to 2-5, e.g. 2.4-4. Said inorganic acid is selected from the group consisting of hydrochloric acid, sulphuric acid, nitric acid and any mixture thereof.

The preferable preparation process can comprise the following steps:

1) a NaY zeolite is (at least) mixed with an ammonium salt, an ammonium phosphate salt and water in a ratio of the NaY zeolite:the ammonium salt:the ammonium phosphate salt:water=1:[0.4-1]:[0-0.04]:[5-10] to obtain a slurry, the slurry is adjusted with an inorganic acid to a pH of 3.0-4.5, then the slurry is treated at 70-95° C. for at least 0.5 hour, and then washed, wherein, the NaY zeolite is on the dry basis, the ammonium phosphate salt is based on the elemental phosphorus;

2) the product obtained in the step 1) is calcined at 350-650° C. in a condition of 1-100% steam for at least 0.5 hour to obtain a firstly calcined zeolite;

3) the firstly calcined zeolite obtained in the step 2) is (at least) mixed with phosphoric acid, an dealumination agent and water in a ratio of the firstly calcined zeolite:phosphoric acid:the dealumination agent:water=1:0-0.04:0.02-0.3:5-10, the resulting mixture is adjusted with an inorganic acid to a pH of 2.3-3.5, then treated at 50-90° C. for at least 0.5 hour, filtered and washed (washing temperature≥50° C.), wherein, the firstly calcined zeolite is on the dry basis, and phosphoric acid is based on the elemental phosphorus;

4) the product obtained in the step 3) is calcined at 350-650° C. in a condition of 1-100% steam for at least 0.5 hour to obtain a secondly calcined zeolite;

5) the secondly calcined zeolite obtained in the step 4) is mixed with a rare earth chloride and water in a ratio of the secondly calcined zeolite:the rare earth chloride:water=1:[0.01-0.05]:[5-10], the resulting mixture is then treated at 70-90° C. for at least 0.5 hour, filtered and washed (washing temperature≥50° C.), wherein, the secondly calcined zeolite is on the dry basis, and the rare earth chloride is based on $RE_2O_3$;

6) the product obtained in the step 5) is calcined at 350-650° C., in a condition of 1-100% steam for at least 0.5 hour to obtain a modified Y-type zeolite.

According to the present invention, a modified zeolite having a high Si/Al ratio and small unit cell size is prepared with the "three-exchanges-and-three-calcinations procedure". The calcination conditions are mild. The aluminum vacancies formed after dealumination can be substituted with silicon as much as possible. Therefore, the modified zeolite has few defects in crystal lattices, and has a good structure-hydrothermal stability, a good activity-hydrothermal stability and a good coke selectivity.

In the present invention, including the following Examples and Comparative Examples, the analysis methods for the zeolite are as follows:

The element content is determined by X-ray fluorescence spectrometry.

The unit cell size and the crystallinity are determined by X-ray diffraction according to the standard methods RIPP145-90 and RIPP146-90 respectively. A reference can be made to Analytical Methods in Petrochemical Industry (RIPP Experiment Techniques), Yang Cuiding et. al, Science Press, 1990.

The crystallinity retention is the ratio of the crystallinity of the sample after the aging treatment to that before the aging treatment.

In the determination of the specific hydroxyl nest concentration, the thermogravimetric analysis data of the zeolite is measured with a TAQ5000IR thermogravimetric analyzer at a constant nitrogen flow with a temperature rise at a speed of 10° C./min to 800° C. according to the TGA analysis procedure, and the specific hydroxyl nest concentration is calculated out.

The light oil micro-activity (MA) is measured according to the standard method RIPP92-90, wherein 2 g of the zeolite is used.

EXAMPLES

Hereinafter, the present invention will be further illustrated with the examples, but the scope of the present invention is not limited thereto.

In the Examples and Comparative Examples, the used starting materials are commercially available and their detailed specifications are as follows.

NaY zeolite, industrial product, Si/Al ratio>4.7, crystallinity>85%, available from Sinopec Catalyst Company, Qilu Division.

Mixed rare earth chloride (also hereinafter called as rare earth chloride for short), industrial grade, specification: per liter, containing lanthanum (as $La_2O_3$) 153 g and cerium (as $Ce_2O_3$) 69 g, available from Sinopec Catalyst Company, Qilu Division.

Ammonium sulfate, chemically pure
Phosphoric acid, chemically pure
Ammonium dihydrogen phosphate, chemically pure
Sulphuric acid, chemically pure
Oxalic acid, solid, chemically pure
Fluorosilicic acid, chemically pure
Hydrochloric acid, chemically pure Example 1

First exchanging: using a NaY zeolite as starting material and exchanging with an ammonium sulfate solution. The NaY zeolite, ammonium sulfate and water were mixed in a weight ratio of the NaY zeolite (dry basis):ammonium sulfate:water=1:1:8. The resulting mixture was adjusted with sulfuric acid to a pH of 3.5, exchanged at 85° C. for 1 hour, filtered, and washed with deionized water to obtain a firstly exchanged zeolite.

First calcination: a hydrothermal calcination treatment. The firstly exchanged zeolite was calcined at 580° C. in a condition of 100% steam for 2 hours to obtain a firstly calcined zeolite.

Second exchanging: treating the firstly calcined zeolite with a solution containing rare earth. The firstly calcined zeolite, rare earth chloride and water were mixed in a weight ratio of firstly calcined zeolite (dry basis):rare earth chloride (as $RE_2O_3$):water=1:0.042:8. The mixture was subjected to an exchange at 70° C. for 1 hour, filtered, washed with deionized water (water temperature≥50° C.) to obtain a secondly exchanged zeolite.

Second calcination: a hydrothermal calcination treatment. The secondly exchanged zeolite was calcined at 580° C. in a condition of 100% steam for 2 hours to obtain a secondly calcined zeolite.

Third exchanging: treating the secondly calcined zeolite with a solution containing phosphoric acid and oxalic acid. The secondly calcined zeolite, phosphoric acid, oxalic acid (containing two molecules of crystalline water) and water were mixed in a weight ratio of secondly calcined zeolite (dry basis):phosphoric acid (as P):oxalic acid (containing two molecules of crystalline water):water=1:0.014:0.14:8. The resulting mixture was adjusted with sulfuric acid to a pH of 2.8. The mixture was subjected to an exchange at 70° C.

for 1 hour, filtered, washed with deionized water (water temperature≥50° C.) to obtain a thirdly exchanged zeolite.

Third calcination: a hydrothermal calcination treatment. The thirdly exchanged zeolite was calcined at 550° C. in a condition of 70% steam for 2 hours to obtain a thirdly calcined zeolite, i.e. a modified zeolite. The properties of the modified zeolite were listed in Table I.

Comparative Example 1

The Preparation of the Modified Y-Type Zeolite According to the Method Disclosed in CN 101537366A 100 g (dry basis) of NaY zeolite was poured into a reactor containing 1000 g of an exchanging solution (containing 0.63% $(NH_4)_2HPO_4$ and 8.58% $NH_4Cl$). The exchange was conducted at 90° C. for 1 hour, while the solution was controlled at a pH=3.0-3.5 in the exchange course. After the exchange, the filtration and washing was conducted. After calcining at 730° C. in a condition of 100% steam for 2 hours, the calcined substance was poured into a reactor containing 1200 g of an exchanging solution (containing 0.58% $RECl_3$ and 6.8% $NH_4Cl$). The exchange was conducted at 90° C. for 1 hour, while the solution was controlled at a pH=6.0-6.5 in the exchange course. After the exchange, the filtration and washing was conducted. After calcining at 730° C. in a condition of 70% steam for 2 hours, a modified zeolite was obtained. The properties of the modified zeolite were listed in Table I.

Example 2

First exchanging: using a NaY zeolite as starting material and exchanging with an ammonium chloride solution. The NaY zeolite, ammonium chloride and water were mixed in a weight ratio of the NaY zeolite (dry basis):ammonium chloride:water=1:0.8:8. The resulting mixture was adjusted with hydrochloric acid to a pH of 4.0, exchanged at 90° C. for 1 hour, filtered, and washed with deionized water to obtain a firstly exchanged zeolite.

First calcination: a hydrothermal calcination treatment. The firstly exchanged zeolite was calcined at 550° C. in a condition of 80% steam for 2 hours to obtain a firstly calcined zeolite.

Second exchanging: treating the firstly calcined zeolite with a solution containing phosphoric acid and fluorosilicic acid. The firstly calcined zeolite, phosphoric acid, fluorosilicic acid, and water were mixed in a weight ratio of firstly calcined zeolite (dry basis):phosphoric acid (as P):fluorosilicic acid:water=1:0.01:0.03:8. The mixture was adjusted with hydrochloric acid to a pH of 2.8, and subjected to an exchange at 70° C. for 1 hour, filtered, washed with deionized water (water temperature≥50° C.) to obtain a secondly exchanged zeolite.

Second calcination: a hydrothermal calcination treatment. The secondly exchanged zeolite was calcined at 550° C. in a condition of 70% steam for 2 hours to obtain a secondly calcined zeolite.

Third exchanging: treating the secondly calcined zeolite with a solution containing rare earth. The secondly calcined zeolite, rare earth chloride and water were mixed in a weight ratio of secondly calcined zeolite (dry basis):rare earth chloride (as $RE_2O_3$):water=1:0.03:8. The mixture was subjected to an exchange at 70° C. for 1 hour, filtered, washed with deionized water (water temperature≥50° C.) to obtain a thirdly exchanged zeolite.

Third calcination: a hydrothermal calcination treatment. The thirdly exchanged zeolite was calcined at 550° C. in a condition of 100% steam for 2 hours to obtain a thirdly calcined zeolite, i.e. a modified zeolite. The properties of the modified zeolite were listed in Table I.

Comparative Example 2

The Preparation of the Modified Y-Type Zeolite According to the Method Disclosed in CN 101537366A 100 g (dry basis) of NaY zeolite was poured into a reactor containing 900 g of an exchanging solution (containing 0.45% $(NH_4)_2HPO_4$ and 10% $(NH_4)_2SO_4$). The exchange was conducted at 90° C. for 1 hour, while the solution was controlled at a pH=3.0-3.5 in the exchange course. After the exchange, the filtration and washing was conducted. After calcining at 730° C. in a condition of 100% steam for 2 hours, the calcined substance was poured into a reactor containing 1200 g of an exchanging solution (containing 0.44% $RECl_3$ and 7.8% $NH_4Cl$). The exchange was conducted at 90° C. for 1 hour, while the solution was controlled at a pH=6.0-6.5 in the exchange course. After the exchange, the filtration and washing was conducted. After calcining at 730° C. in a condition of 100% steam for 2 hours, a modified zeolite was obtained. The properties of the modified zeolite were listed in Table I.

Example 3

First exchanging: using a NaY zeolite as starting material and exchanging with an ammonium sulfate solution. The NaY zeolite, ammonium sulfate and water were mixed in a weight ratio of the NaY zeolite (dry basis):ammonium sulfate:water=1:1:10. The resulting mixture was adjusted with sulfuric acid to a pH of 3.5, exchanged at 90° C. for 2 hours, filtered, and washed with deionized water to obtain a firstly exchanged zeolite.

First calcination: a hydrothermal calcination treatment. The firstly exchanged zeolite was calcined at 580° C. in a condition of 100% steam for 2 hours to obtain a firstly calcined zeolite.

Second exchanging: treating the firstly calcined zeolite with a solution containing a phosphate salt and oxalic acid. The firstly calcined zeolite, diammonium hydrogen phosphate, oxalic acid and water were mixed in a weight ratio of firstly calcined zeolite (dry basis):diammonium hydrogen phosphate (as P):oxalic acid:water=1:0.018:0.18:8. The resulting mixture was adjusted with hydrochloric acid to a pH of 2.8, and subjected to an exchange at 70° C. for 1 hour, filtered, washed with deionized water (water temperature≥50° C.) to obtain a secondly exchanged zeolite.

Second calcination: a hydrothermal calcination treatment. The secondly exchanged zeolite was calcined at 550° C. in a condition of 100% steam for 2 hours to obtain a secondly calcined zeolite.

Third exchanging: treating the secondly calcined zeolite with a solution containing rare earth. The secondly calcined zeolite, rare earth chloride and water were mixed in a weight ratio of secondly calcined zeolite (dry basis):rare earth chloride (as $RE_2O_3$):water=1:0.02:8. The mixture was subjected to an exchange at 85° C. for 1 hour, filtered, washed with deionized water (water temperature≥50° C.) to obtain a thirdly exchanged zeolite.

Third calcination: a hydrothermal calcination treatment. The thirdly exchanged zeolite was calcined at 580° C. in a condition of 100% steam for 2 hours to obtain a thirdly calcined zeolite, i.e. a modified zeolite. The properties of the modified zeolite were listed in Table I.

Comparative Example 3

The Preparation of the Modified Y-Type Zeolite According to the Method Disclosed in CN 101537366A 100 g (dry basis) of NaY zeolite was poured into a reactor containing 1000 g of an exchanging solution (containing 0.63% $(NH_4)_2HPO_4$ and 10% $(NH_4)_2SO_4$). The exchange was conducted at 90° C. for 1 hour, while the solution was controlled at a pH=3.0-3.5 in the exchange course. After the exchange, the filtration and washing was conducted. After calcining at 670° C. in a condition of 100% steam for 2 hours, the calcined substance was poured into a reactor containing 400 g of an exchanging solution (containing 0.60% $RECl_3$ and 6.8% $NH_4Cl$). The exchange was conducted at 90° C. for 1 hour, while the solution was controlled at a pH=6.0-6.5 in the exchange course. After the exchange, the filtration and washing was conducted. After calcining at 700° C. in a condition of 100% steam for 2 hours, a modified zeolite was obtained. The properties of the modified zeolite were listed in Table I.

Example 4

First exchanging: using a NaY zeolite as starting material and exchanging with a solution containing a phosphate salt and ammonium sulfate. The NaY zeolite, ammonium dihydrogen phosphate, ammonium sulfate and water were mixed in a weight ratio of NaY zeolite (dry basis):ammonium dihydrogen phosphate(as P):ammonium sulfate:water=1:0.05:1:8. The resulting mixture was adjusted with sulfuric acid to a pH of 3.0, exchanged at 85° C. for 1 hour, filtered, and washed with deionized water to obtain a firstly exchanged zeolite.

First calcination: a hydrothermal calcination treatment. The firstly exchanged zeolite was calcined at 580° C. in a condition of 100% steam for 2 hours to obtain a firstly calcined zeolite.

Second exchanging: treating the firstly calcined zeolite with a solution containing oxalic acid. The firstly calcined zeolite, oxalic acid and water were mixed in a weight ratio of firstly calcined zeolite (dry basis):oxalic acid:water=1:0.2:8. The resulting mixture was adjusted with sulfuric acid to a pH of 2.4, and subjected to an exchange at 70° C. for 1 hour, filtered, washed with deionized water (water temperature≥50° C.) to obtain a secondly exchanged zeolite.

Second calcination: a hydrothermal calcination treatment. The secondly exchanged zeolite was calcined at 550° C. in a condition of 100% steam for 2 hours to obtain a secondly calcined zeolite.

Third exchanging: treating the secondly calcined zeolite with a solution containing rare earth. The secondly calcined zeolite, rare earth chloride and water were mixed in a weight ratio of secondly calcined zeolite (dry basis):rare earth chloride (as $RE_2O_3$):water=1:0.01:8. The mixture was subjected to an exchange at 70° C. for 1 hour, filtered, washed with deionized water (water temperature≥50° C.) to obtain a thirdly exchanged zeolite.

Third calcination: a hydrothermal calcination treatment. The thirdly exchanged zeolite was calcined at 600° C. in a condition of 100% steam for 2 hours to obtain a thirdly calcined zeolite, i.e. a modified zeolite. The properties of the modified zeolite were listed in Table I.

Comparative Example 4

The Preparation of the Modified Y-Type Zeolite According to the Method Disclosed in CN 101537366A 100 g (dry basis) of NaY zeolite was poured into a reactor containing 1200 g of an exchanging solution (containing 1.22% $(NH_4)_2HPO_4$ and 8.58% $NH_4Cl$). The exchange was conducted at 90° C. for 1 hour, while the solution was controlled at a pH=5.0-5.5 in the exchange course. After the exchange, the filtration and washing was conducted. After calcining at 620° C. in a condition of 100% steam for 2 hours, the calcined substance was poured into a reactor containing 1200 g of an exchanging solution (containing 0.055% $RECl_3$ and 7.8% $NH_4Cl$). The exchange was conducted at 90° C. for 1 hour, while the solution was controlled at a pH=6.0-6.5 in the exchange course. After the exchange, the filtration and washing was conducted. After calcining at 700° C. in a condition of 100% steam for 2 hours, a modified zeolite was obtained. The properties of the modified zeolite were listed in Table I.

Example 5

First exchanging: using a NaY zeolite as starting material and exchanging with a solution containing a phosphate salt and ammonium sulfate. The NaY zeolite, ammonium dihydrogen phosphate, ammonium sulfate and water were mixed in a weight ratio of NaY zeolite (dry basis):ammonium dihydrogen phosphate(as P):ammonium sulfate:water=1:0.05:1:8. The resulting mixture was adjusted with sulfuric acid to a pH of 3.5, exchanged at 90° C. for 2 hours, filtered, and washed with deionized water to obtain a firstly exchanged zeolite.

First calcination: a hydrothermal calcination treatment. The firstly exchanged zeolite was calcined at 550° C. in a condition of 100% steam for 2 hours to obtain a firstly calcined zeolite.

Second exchanging: treating the firstly calcined zeolite with a solution containing rare earth. The firstly calcined zeolite, rare earth chloride and water were mixed in a weight ratio of firstly calcined zeolite (dry basis):rare earth chloride (as $RE_2O_3$):water=1:0.02:8. The resulting mixture was subjected to an exchange at 85° C. for 1 hour, filtered, washed with deionized water (water temperature≥50° C.) to obtain a secondly exchanged zeolite.

Second calcination: a hydrothermal calcination treatment. The secondly exchanged zeolite was calcined at 580° C. in a condition of 100% steam for 2 hours to obtain a secondly calcined zeolite.

Third exchanging: treating the secondly calcined zeolite with a solution containing a phosphate salt and fluorosilicic acid. The secondly calcined zeolite, diammonium hydrogen phosphate, fluorosilicic acid and water were mixed in a weight ratio of secondly calcined zeolite (dry basis):diammonium hydrogen phosphate(as P):fluorosilicic acid:water=1:0.006:0.03:8. The mixture was adjusted with hydrochloric acid to a pH of 3.0, and subjected to an exchange at 70° C. for 1 hour, filtered, washed with deionized water (water temperature≥50° C.) to obtain a thirdly exchanged zeolite.

Third calcination: a hydrothermal calcination treatment. The thirdly exchanged zeolite was calcined at 550° C. in a condition of 100% steam for 2 hours to obtain a thirdly calcined zeolite, i.e. a modified zeolite. The properties of the modified zeolite were listed in Table I.

Comparative Example 5

The Preparation of the Modified Y-Type Zeolite According to the Method Disclosed in CN 101537366A 100 g (dry basis) of NaY zeolite was poured into a reactor containing 1500 g of an exchanging solution (containing 1.11% (NH$_4$)$_2$HPO$_4$ and 8.58% NH$_4$Cl). The exchange was conducted at 90° C. for 1 hour, while the solution was controlled at a pH=4.5-5.0 in the exchange course. After the exchange, the filtration and washing was conducted. After calcining at 650° C. in a condition of 100% steam for 2 hours, the calcined substance was poured into a reactor containing 1000 g of an exchanging solution (containing 0.35% RECl$_3$ and 7.8% NH$_4$Cl). The exchange was conducted at 90° C. for 1 hour, while the solution was controlled at a pH=6.0-6.5 in the exchange course. After the exchange, the filtration and washing was conducted. After calcining at 700° C. in a condition of 70% steam for 2 hours, a modified zeolite was obtained. The properties of the modified zeolite were listed in Table I.

hours and 24 hours at 800° C. in a condition of 100% steam. The aged samples were measured for light oil micro-activity (MA) and coke yield, and the coke yield/conversion ratio was also calculated. The results were shown in Table 3, FIG. 3, Table 4 and FIG. 4 respectively.

Figure 3:
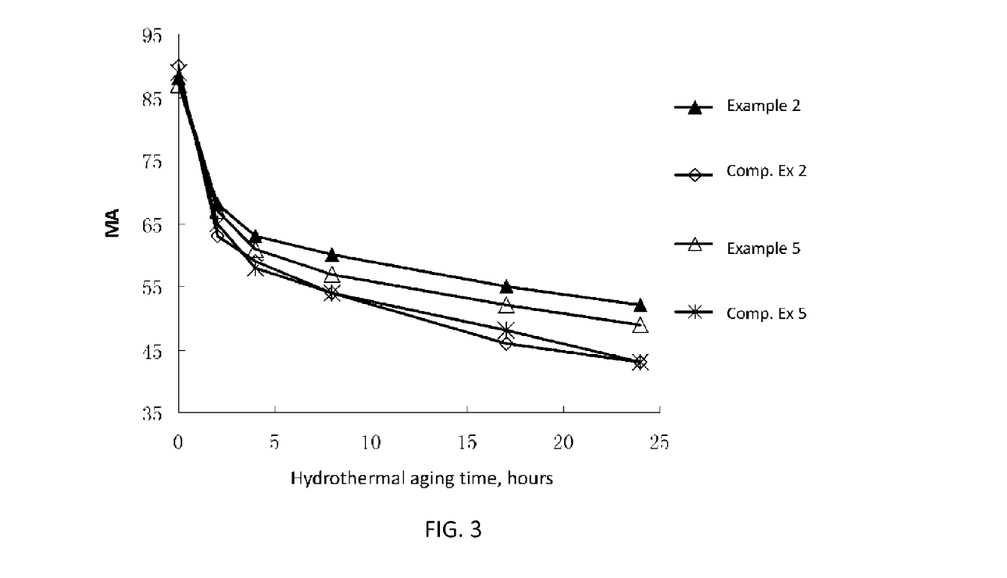
FIG. 3 shows a curve for comparing the data about the activity between the Example and the Comparative Example.

It can be seen from Table 3 and FIG. 3 that, in the rigorous hydrothermal environment, the modified Y-type zeolites of the present invention, after the initial quick deactivation, promptly reached balanced activities, which were remarkably higher than those in Comparative Examples. This showed that the zeolite of the present invention had better activity-stability.

Figure 4:
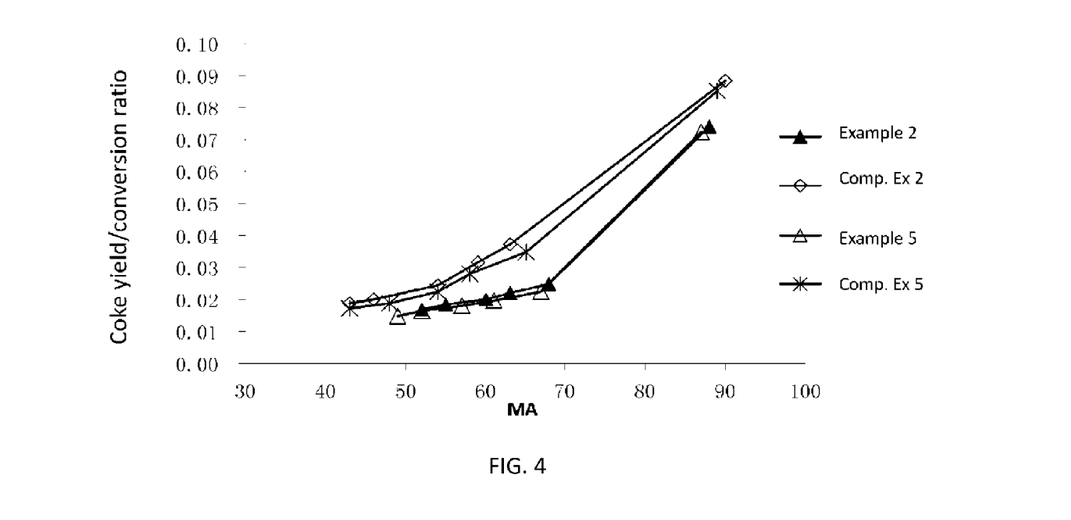
FIG. 4 shows a curve for comparing the data about the coke selectivity between the Example and the Comparative Example.

It can be seen from Table 4 and FIG. 4 that the modified Y-type zeolites of the present invention had better coke selectivity than those in Comparative Examples.

TABLE I

| | Unit cell size (nm) | Weight loss percent | | | Crystallinity | Element Mass Fraction | | | Specific hydroxyl nest concentration (mmol/g) |
| --- | --- | --- | --- | --- | --- | --- | --- | --- | --- |
| | | M$_{200°C.}$ | M$_{500°C.}$ | M$_{800°C.}$ | | P | RE$_2$O$_3$ | Al$_2$O$_3$ | |
| Example 1 | 2.438 | 13.2% | 14.63% | 15.23% | 56% | 1.0% | 3.6% | 18.5% | 0.17 |
| Comparative Example 1 | 2.440 | 12.79% | 14.45% | 14.97% | 45% | 1.1% | 3.4% | 23.1% | 0.48 |
| Example 2 | 2.437 | 10.45% | 11.79% | 12.36% | 57% | 0.7% | 2.7% | 19.2% | 0.14 |
| Comparative Example 2 | 2.438 | 11.30% | 13.00% | 13.51% | 45% | 0.6% | 2.5% | 23.4% | 0.51 |
| Example 3 | 2.436 | 14.46% | 15.86% | 16.43% | 55% | 1.5% | 1.6% | 17.9% | 0.19 |
| Comparative Example 3 | 2.438 | 13.51% | 15.20% | 15.73% | 49% | 1.3% | 1.54% | 23.1% | 0.45 |
| Example 4 | 2.429 | 12.62% | 14.07% | 14.58% | 53% | 4.0% | 0.4% | 18.2% | 0.29 |
| Comparative Example 4 | 2.438 | 14.98% | 16.56% | 17.10% | 48% | 4.0% | 0.3% | 22.6% | 0.38 |
| Example 5 | 2.435 | 12.57% | 14.07% | 14.66% | 55% | 4.5% | 1.7% | 16.8% | 0.22 |
| Comparative Example 5 | 2.438 | 13.18% | 14.83% | 15.37% | 47% | 4.5% | 1.8% | 22.3% | 0.43 |

Example 6

This example illustrates the structure-hydrothermal stability of the modified Y-type zeolite of the present invention.

Figure 1:
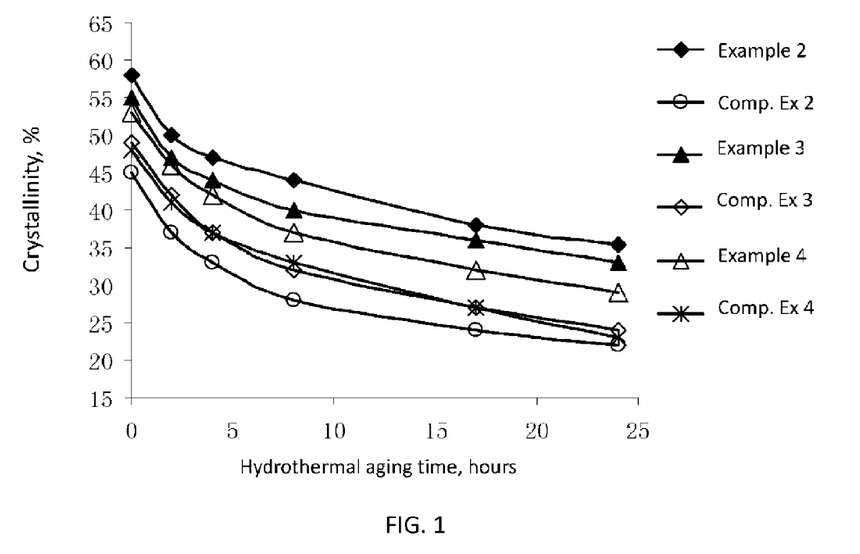
FIG. 1 shows a curve for comparing the data about the crystallinity between the Example and the Comparative Example.
Figure 2:
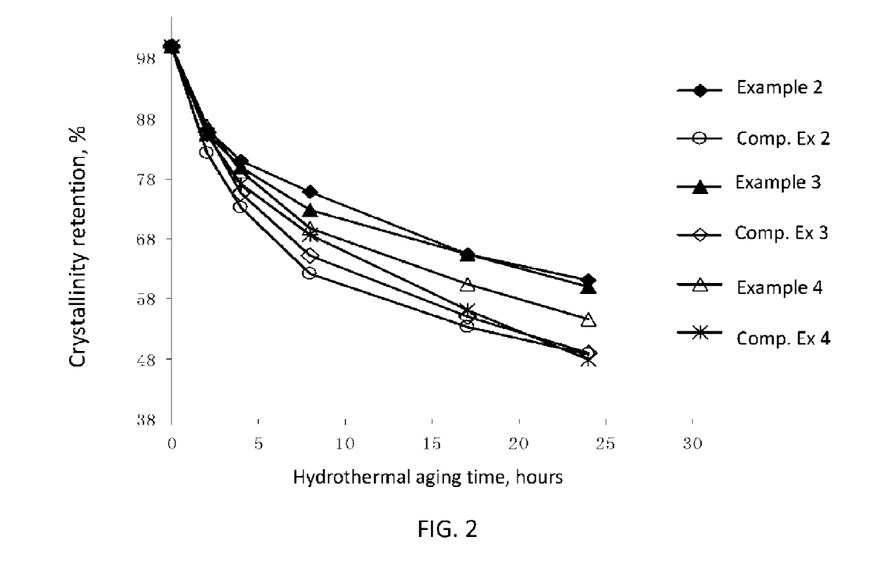
FIG. 2 shows a curve for comparing the data about the crystallinity retention between the Example and the Comparative Example.

The samples prepared in the above Examples 2-4 and Comparative Examples 2-4 were subjected to hydrothermal aging treatments for 2 hours, 4 hours, 8 hours, 17 hours and 24 hours at 800° C. in a condition of 100% steam. The aged samples were measured for crystallinity. The results of crystallinity and crystallinity retention were shown in Table 1, FIG. 1, Table 2 and FIG. 2 respectively.

It can be seen from the above results that the modified Y-type zeolites of the present invention had better crystallinity and better crystallinity retention after the hydrothermal aging treatment under different aging levels than those in the Comparative Examples.

This example demonstrated that the modified Y-type zeolites of the present invention had better structure-hydrothermal stability.

Example 7

This example illustrates the activity-hydrothermal stability and the coke selectivity of the modified Y-type zeolite of the present invention.

The samples prepared in the above Examples 2 and 5 and Comparative Examples 2 and 5 were subjected to hydrothermal aging treatments for 2 hours, 4 hours, 8 hours, 17

TABLE 1

The crystallinity of the zeolite at different aging time-points

| | Crystallinity (%) Aging time/h | | | | | |
| --- | --- | --- | --- | --- | --- | --- |
| | 0 | 2 | 4 | 8 | 17 | 24 |
| Example 2 | 57 | 50 | 47 | 44 | 38 | 36 |
| Comparative Example 2 | 45 | 37 | 33 | 28 | 24 | 22 |
| Example 3 | 55 | 47 | 44 | 40 | 36 | 33 |
| Comparative Example 3 | 49 | 42 | 37 | 32 | 27 | 24 |
| Example 4 | 53 | 46 | 42 | 37 | 32 | 29 |
| Comparative Example 4 | 48 | 41 | 37 | 33 | 27 | 23 |

TABLE 2

The crystallinity retention of the zeolite at different aging time-points

| | Crystallinity retention (%) Aging time/h | | | | | |
| --- | --- | --- | --- | --- | --- | --- |
| | 0 | 2 | 4 | 8 | 17 | 24 |
| Example 2 | 100 | 87 | 82 | 77 | 66 | 62 |
| Comparative Example 2 | 100 | 82 | 73 | 62 | 53 | 49 |
| Example 3 | 100 | 85 | 80 | 73 | 65 | 60 |
| Comparative Example 3 | 100 | 86 | 76 | 65 | 55 | 49 |

TABLE 2-continued

The crystallinity retention of the zeolite at different aging time-points

| | Crystallinity retention (%) Aging time/h | | | | | |
|---|---|---|---|---|---|---|
| | 0 | 2 | 4 | 8 | 17 | 24 |
| Example 4 | 100 | 87 | 79 | 70 | 60 | 55 |
| Comparative Example 4 | 100 | 85 | 77 | 69 | 56 | 48 |

TABLE 3

Activity of the zeolite at different aging time-points

| | MA (no unit) Aging time/h | | | | | |
|---|---|---|---|---|---|---|
| | 0 | 2 | 4 | 8 | 17 | 24 |
| Example 2 | 88 | 68 | 63 | 60 | 55 | 52 |
| Comparative Example 2 | 90 | 63 | 59 | 54 | 46 | 43 |
| Example 5 | 87 | 67 | 61 | 56 | 52 | 49 |
| Comparative Example 5 | 89 | 65 | 58 | 54 | 48 | 43 |

TABLE 4

Coke selectivity of the zeolite at different aging time-points

| | Coke yield/conversion ratio (%) Aging time/h | | | | | |
|---|---|---|---|---|---|---|
| | 0 | 2 | 4 | 8 | 17 | 24 |
| Example 2 | 7.4 | 2.5 | 2.2 | 2.0 | 1.8 | 1.7 |
| Comparative Example 2 | 8.8 | 3.7 | 3.1 | 2.5 | 2.0 | 1.9 |
| Example 5 | 7.3 | 2.2 | 2.0 | 1.8 | 1.6 | 1.5 |
| Comparative Example 5 | 8.5 | 3.5 | 2.8 | 2.3 | 1.9 | 1.7 |

The invention claimed is:

1. A modified Y-type zeolite, comprising, by weight percentage of a total weight of the modified Y-type zeolite, a phosphorus content of 0.05-6%, a $RE_2O_3$ content of 0.03-10%, and an alumina content of less than 22%, and having a specific hydroxyl nest concentration of less than 0.35 mmol/g and more than 0.05 mmol/g, said specific hydroxyl nest concentration =

$$\frac{[(M_{500° C.} - M_{200° C.}) - (17/9) \times (M_{800° C.} - M_{500° C.})] \times 1000}{36 \times (1 - M_{200° C.}) \times C}$$

(unit: mmol/g)

wherein $M_{200° C.}$, $M_{500° C.}$ and $M_{800° C.}$ are respectively percentages of weight loss of the modified Y-type zeolite measured at 200° C., 500° C., and 800° C., and C is a crystallinity of the modified Y-type zeolite.

2. The modified Y-type zeolite according to claim 1, wherein the phosphorus content is 0.1-4.5%, the $RE_2O_3$ content is 0.1-4.5%, the alumina content is less than 21%, and wherein the modified Y-type zeolite has a unit cell size of 2.428-2.438 nm, and a crystallinity retention rate of 85%-87%, wherein the crystallinity retention rate is measured upon aging the modified Y-type zeolite in 100% steam at 800° C. for two hours.

3. The modified Y-type zeolite of claim 1, having a crystallinity of 53% to 57%.

4. The modified Y-type zeolite of claim 1, having a crystallinity retention rate of 85%-87%, wherein the crystallinity retention rate is measured upon aging the modified Y-type zeolite in 100% steam at 800° C. for two hours.

5. A process for preparing a modified Y-type zeolite, wherein the modified Y-zeolite comprises, by weight percentage of a total weight of the modified Y-type zeolite, a phosphorus content of 0.05-6%, a $RE_2O_3$ content of 0.03-10%, and an alumina content of less than 22%, the modified Y-type zeolite has a unit cell size of 2.420-2.440 nm and a crystallinity of 53%-57%, and has a specific hydroxyl nest concentration of between 0.05 mmol/g and 0.35 mmol/g, the process comprising:
treating a NaY zeolite sequentially in a first exchange step, a first hydrothermal treatment step, a second exchange step, a second hydrothermal treatment step, a third exchange step, and a third hydrothermal treatment step, wherein the first exchange step comprises mixing the NaY zeolite with a first exchange solution to form a first mixture, wherein the second exchange step comprises mixing a zeolite from the first hydrothermal treatment step with a second exchange solution to form a second mixture, and wherein the third exchange step comprises mixing a zeolite from the second hydrothermal treatment step with a third exchange solution to form a third mixture, wherein the first exchange solution comprises a phosphorus-containing substance but not a rare earth-containing substance or a dealumination agent, and wherein each of the second exchange solution and the third exchange solution independently comprises one or more chosen from a phosphorus-containing substance, a rare earth-containing substance, or a dealumination agent.

6. The process according to claim 5, wherein the modified Y-zeolite has a unit cell size of 2.428-2.438 nm, a phosphorus content of 0.1-4.5%, a $RE_2O_3$ content of 0.1-4.5%, and an alumina content of less than 21%.

7. The process according to claim 5, wherein said phosphorus-containing substance is selected from the group consisting of orthophosphoric acid, phosphorous acid, pyrophosphoric acid, ammonium phosphate, diammonium hydrogen phosphate, ammonium dihydrogen phosphate, aluminum phosphate, and any mixture thereof.

8. The process according to claim 5, wherein said rare earth-containing substance is selected from the group consisting of lanthanum oxide, cerium oxide, lanthanum nitrate, cerium nitrate, lanthanum chloride, cerium chloride, a mixed rare earth nitrate, a mixed rare earth chloride, and any mixture thereof.

9. The process according to claim 5, wherein said dealumination agent is selected from the group consisting of ethylene diamine tetraacetic acid, oxalic acid, citric acid, sulfosalicylic acid, fluorosilicic acid, hydrochloric acid, sulphuric acid, nitric acid, ammonium oxalate, ammonium fluoride, ammonium fluorosilicate, ammonium fluoroborate, and any mixture thereof.

10. The process according to claim 5, wherein each of the first mixture, the second mixture, and the third mixture is maintained at 60-100° C. for at least 0.5 hour.

11. The process according to claim 5, wherein each of the first hydrothermal treatment step, the second hydrothermal treatment step, and the third hydrothermal treatment step is independently conducted at 350-650° C. in an atmosphere containing 1-100% of steam for at least 0.5 hour.

12. The process according to claim 5, wherein each of the first mixture, the second mixture, and the third mixture is maintained at 70-90° C. for 1-2 hours.

13. The process according to claim 5, wherein each of the first hydrothermal treatment step, the second hydrothermal treatment step, and the third hydrothermal treatment step is independently conducted at 550-600° C. in an atmosphere containing 70%-100% of steam for 1-2 hours.

14. The process according to claim 5, where the modified Y-type zeolite has a crystallinity retention rate of 85%-87%, wherein the crystallinity retention rate is measured upon aging the modified Y-type zeolite in 100% steam at 800° C. for two hours.

15. A process for preparing a modified Y-type zeolite, wherein the modified Y-zeolite comprises, by weight percentage of a total weight of the modified Y-type zeolite, a phosphorus content of 0.05-6%, a $RE_2O_3$ content of 0.03-10%, and an alumina content of less than 22%, the modified Y-type zeolite has a unit cell size of 2.420-2.440 nm and a crystallinity of 53%-57%, and has a specific hydroxyl nest concentration of between 0.05 mmol/g and 0.35 mmol/g, the process comprising:
1) mixing a NaY zeolite with an ammonium salt, an ammonium phosphate salt and water in a weight ratio of the NaY zeolite:the ammonium salt:the ammonium phosphate salt:water=1:[0.4-1]:[0-0.04]:[5-10] to obtain a slurry, adjusting a pH of the slurry to 3.0-4.5 using an inorganic acid, maintaining a temperature of the slurry at 70-95° C. for at least 0.5 hour, and separating the zeolite from the slurry and washing the zeolite, wherein a weight of the NaY zeolite is on the dry basis and a weight of the ammonium phosphate salt is based on the elemental phosphorus;
2) the zeolite obtained from the step 1) is calcined at 350-650° C. in an atmosphere of 1-100% steam for at least 0.5 hour to obtain a firstly calcined zeolite;
3) mixing the firstly calcined zeolite obtained from the step 2), phosphoric acid, an dealumination agent and water in a ratio of the firstly calcined zeolite:phosphoric acid:the dealumination agent:water=1:[0-0.04]:[0.02-0.3]:[5-10], adjusting a pH of the resulting mixture to 2.3-3.5 with an inorganic acid, maintaining a temperature of the mixture at 50-90° C. for at least 0.5 hour, separating the zeolite from the mixture and washing the zeolite, wherein a weight of the firstly calcined zeolite is on the dry basis and a weight of phosphoric acid is based on the elemental phosphorus;
4) the product obtained from the step 3) is calcined at 350-650° C. in an atmosphere of 1-100% steam for at least 0.5 hour to obtain a secondly calcined zeolite;
5) the secondly calcined zeolite obtained from the step 4) is mixed with one or more rare earth chloride and water in a ratio of the secondly calcined zeolite:the rare earth chloride:water=1:[0.01-0.05]:[5-10], maintaining a temperature of the resulting mixture at 70-90° C. for at least 0.5 hour, separating the zeolite from the mixture and washing the zeolite, wherein a weight of the secondly calcined zeolite is on the dry basis and a weight of the rare earth chloride is based on $RE_2O_3$; and
6) the product obtained from the step 5) is calcined at 350-650° C. in an atmosphere of 1-100% steam for at least 0.5 hour to obtain a modified Y-type zeolite.

16. The process according to claim 15, wherein in step (3) the washing of the zeolite is carried out at a temperature of 50° C. or more.

17. The process according to claim 15, wherein in step (5) the washing of the zeolite is carried out at a temperature of 50° C. or more.

18. The process according to claim 15, where the modified Y-type zeolite has a crystallinity retention rate of 85%-87%, wherein the crystallinity retention rate is measured upon aging the modified Y-type zeolite in 100% steam at 800° C. for two hours.

19. A method for catalytically cracking a heavy oil feedstock, comprising: preparing a modified Y-type zeolite of claim 1; and bringing a heavy oil feedstock into contact with the modified Y-type zeolite.

20. The method according to claim 19, wherein the modified Y-type zeolite is prepared by the process of claim 5.

* * * * *